Oct. 10, 1939.  R. W. BANKS  2,175,735
ADJUSTABLE JAR ELEMENT AND SEALING CUP
Filed June 25, 1937  2 Sheets-Sheet 1
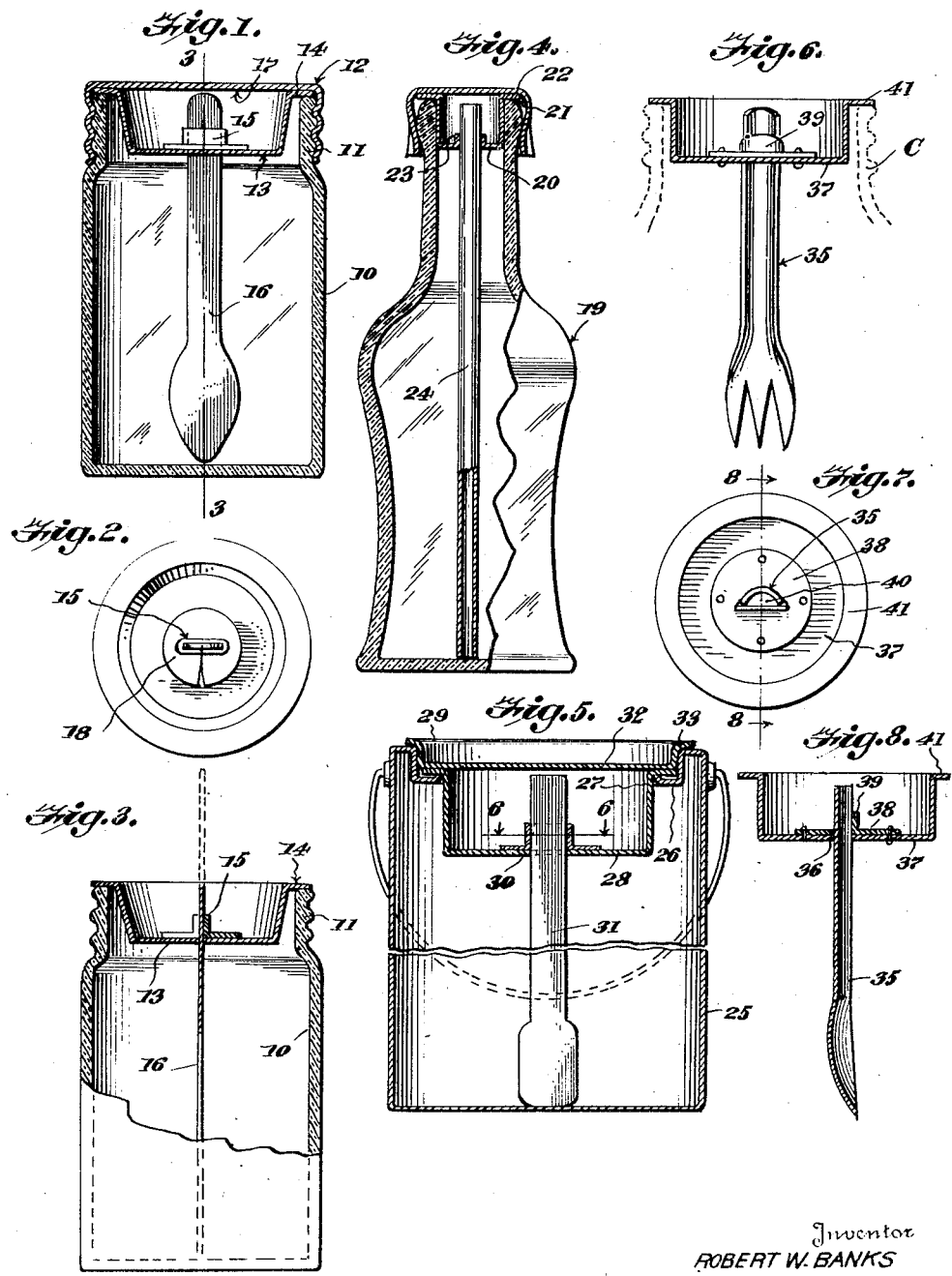
Inventor
ROBERT W. BANKS Oct. 10, 1939.    R. W. BANKS    2,175,735
ADJUSTABLE JAR ELEMENT AND SEALING CUP
Filed June 25, 1937    2 Sheets-Sheet 2
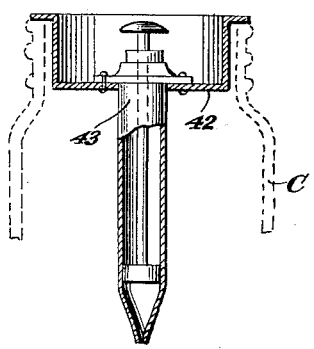
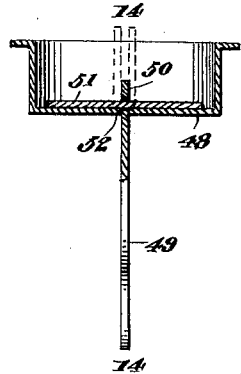
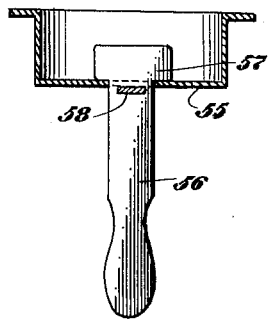
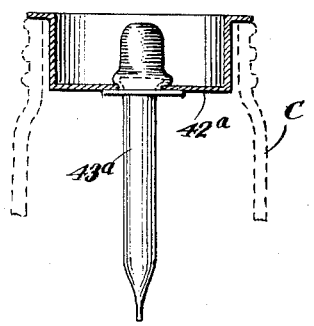
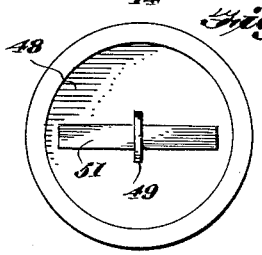
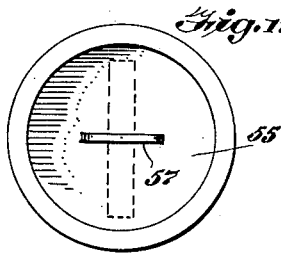
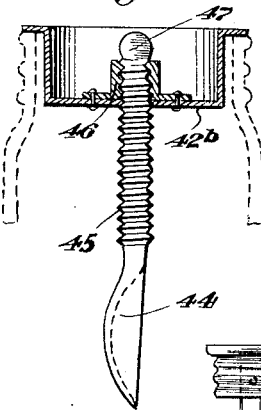
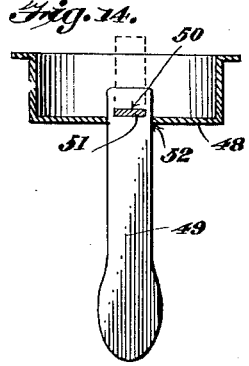
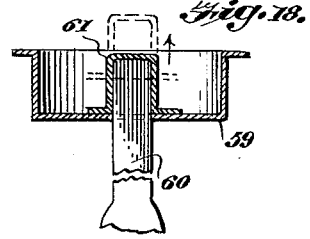
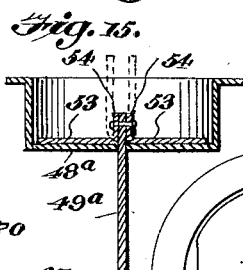
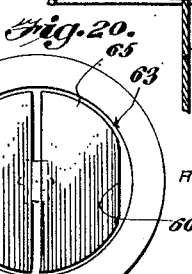
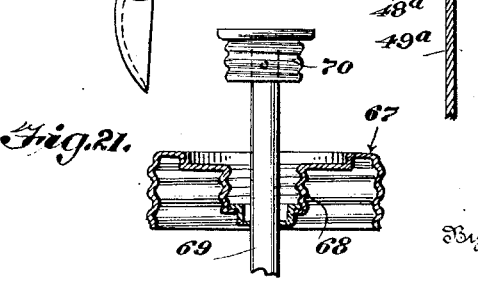
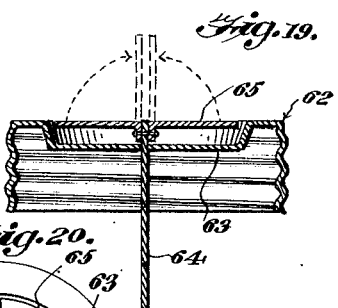
Inventor
ROBERT W. BANKS Patented Oct. 10, 1939

2,175,735

UNITED STATES PATENT OFFICE 2,175,735

ADJUSTABLE JAR ELEMENT AND SEALING CUP

Robert W. Banks, Memphis, Tenn.

Application June 25, 1937, Serial No. 150,405

1 Claim. (Cl. 221—67)

This invention relates to adjustable jar elements and sealing cups, and has for one of its objects the production of a simple and efficient means attached to or carried by a sealing cup which may be used for removing the contents of a container.

A further object of this invention is the production of a simple and efficient cup and jar element, the construction of which is so designed as to permit the container or jar to which the cup is connected, to be stacked one upon the other, and thereby occupy a minimum amount of space.

Another object of this invention is the production of a cup and dishing element therefor, which is so constructed as to be attached to a container to constitute a sealed-in container wherein the dishing element is mounted within the container for producing a sanitary covered and compact container.

Other objects and advantages of the present invention will appear throughout the following specification and claim.

In the drawings:

Figure 1 is a vertical sectional view through a container and cup showing one form of jar element;

Figure 2 is a top plan view of the structure shown in Figure 1;

Figure 3 is a vertical sectional view taken on line 3—3 of Figure 1;

Figure 4 is a vertical sectional view of a bottle having an element such as a drinking straw carried by the cup, certain parts in Figure 4 being shown in side elevation;

Figure 5 is a vertical sectional view of a modified form of my invention showing the type of cup and element as used with a receptacle of the pail type;

Figure 6 is a vertical sectional view of a further modified form of cup and serving element;

Figure 7 is a top plan view of the structure shown in Figure 6;

Figure 8 is a sectional view taken on line 8—8 of Figure 7;

Figure 9 is a vertical sectional view of another modified form, certain parts being shown in elevation;

Figure 10 is a vertical sectional view of a further modified form of cup, showing a medicine dropper in side elevation;

Figure 11 is a vertical sectional view of still another modified form of my invention;

Figure 12 is a vertical sectional view of a cup and serving element, the serving element having upwardly folding finger-gripping portions;

Figure 13 is a top plan view of the structure shown in Figure 12;

Figure 14 is a vertical view taken on line 14—14 of Figure 12;

Figure 15 is a vertical sectional view of a further modified form of the type of structure shown in Figure 12;

Figure 16 is a vertical sectional view of yet another modified form of my invention;

Figure 17 is a top plan view of the structure shown in Figure 16;

Figure 18 is a vertical sectional view of a structure slightly modified with respect to Figure 17;

Figure 19 is a vertical sectional view illustrating a modified form of the type of structure shown in Figure 12;

Figure 20 is a top plan view of the structure shown in Figure 19;

Figure 21 is a vertical sectional view of a modified form of the invention, wherein the serving or dishing element is threaded into the cup.

By referring to the drawings it will be seen that 10 designates the container in the type shown in Figures 1 to 3 inclusive, of the jar type having a threaded upper end 11 upon which is threaded a closure or sealing cap 12 completely covering the outer end of the container 10. A cup 13 is fitted within the outer end 11 of the container 10 and tapers inwardly to provide a cone-like structure, the upper outer edge of the cup 13 being provided with a laterally extending annular flange 14 for overhanging the outer end 11 of the container 10, as shown in Figures 1 and 3. This flange 14 fits between the outer end 11 of the container 10 and the inner face of the sealing cap 12. A guiding neck 15 is carried by the upper face of the cup 13 and extends upwardly through which the spoon or paddle element 16 extends, the neck 15 fitting snugly around the spoon or paddle element 16 to completely seal the same and to also provide an efficient scraping and cleaning means for the paddle 16, as it is drawn upwardly through the bottom of the cup 13 and the guiding neck 15. The paddle or spoon element 16 may be of any suitable or desired type without departing from the spirit of the invention, but it is important that this element 16 be only of sufficient length to extend to the bottom 10 and terminate short of the under face 17 of the cap 12, as shown in Figure 1, when the parts are in a closed or sealed position. The guiding neck 15 preferably constitutes an upstanding collar fitting snugly around the element 16 and a lateral annular flange 18, which flange 18 is fitted snugly upon the upper face of the bottom of the cup 13, as shown. The parts may be formed of pressed sheet metal and stamped to the desired shape. The cup 13, as stated above, is preferably conical shaped to fit conveniently and easily within the upper end of the container 10.

It should be borne in mind that in the structure shown in Figure 3, as well as in the other forms described in the following, the dishing or serving paddle or spoon element of any type is adapted to lie in its normal position below or flush with the outer or upper edge of the supporting element, such as the cap or cup.

In Figure 4, there is shown a modified type of the invention as applied to a container in the nature of a bottle, indicated by the numeral 19. A cup 20 is fitted within the outer end of the neck of the bottle and is provided with a laterally extending annular flange 21 overhanging the outer end of the neck of the bottle. A sealing cap 22 is fitted and clamped over the outer end of the neck of the bottle 19 so as to clamp the flange 21 between the cap 22 and the outer end of the neck of the bottle 19. The cup 20 is provided with an upstanding collar 23 formed around a central aperture formed in the cup 20 through which a drinking straw 24 extends. The straw is adapted to extend to the bottom of the bottle 19 may be drawn through the collar 23 upwardly, the straw normally being of a length to be shielded by the cap 22, the outer end of the drinking straw or tube 24 terminating short of the outer end of the cup 20.

In Figure 5 there is shown a modified form of the invention as applied to a container of the particular type indicated by the numeral 25 which container is provided with an inset ledge 26, the inner edge of which is upturned to provide a sealing flange 27 at its inner periphery. A cup member 28 is fitted within the outer end of the container 25 and is provided with an outwardly extending annular flange 29 along its upper periphery which overhangs and fits upon the flange 27 as well as overhanging the inset ledge 26. The cup 28 is provided with a sealing and guiding upstanding neck 30 through which a dishing or serving element such as a paddle 31 extends, the paddle 31 extending from the cup 28 to the bottom of the receptacle and sliding through the neck 30, the upper end of the paddle 31 normally lying substantially flush with the flange 29. A sealing cap 32 of the clincher type fits over the outer end of the container 25 and is provided with a clincher flange 33 adapted to tightly engage and seal the shoulder 34.

In Figures 6, 7 and 8, there is shown a still further modified type of the invention wherein a conventional serving fork 35 is shown having a shank portion which is concavo-convex in cross section extending through a suitable crescent shaped aperture 36 formed in the cup 37 so that the element 35 may be snugly engaged throughout its transverse extremity as the element is drawn through the cup 37. A reinforcing plate 38 is carried by the upper face of the cup 37 and is provided with a bracing tongue 39 struck from the aperture 40 for engaging one face of the element 37, as shown in Figures 6 and 8. The cup 37 is provided with an outwardly extending annular flange 41 which is adapted to rest upon the upper end of a container C, the container C being shown in dotted lines. A suitable sealing cap such as the cap 12 may be used in connection therewith and the cup 37 may be used in conjunction with the container such as the container 10, and may be substituted for the cup 13 if desired.

As shown in Figures 9, 10 and 11, I have illustrated certain types of implements or elements which may be supported by a cup 42 which is adapted to fit into the upper end of a container C shown in dotted lines, similar to the container 10 shown in Figure 1. In the type shown in Figure 9, the cup 42 supports a syringe 43. The type shown in Figure 10 illustrates the cup 42a supporting a medicine dropper 43a. In the type shown in Figure 11, the cup 42b supports a spoon 44 having a threaded shank 45 extending through a threaded collar 46 carried by the cup 42b. The shank 45 carries a gripping knob 47 at its upper end normally lying substantially flush with the upper edge of the cup 42, as shown.

In Figures 12 to 14 inclusive, I have shown a further modified type of my invention, embodying a supporting cup 48 which is adapted to fit into the outer end of a container such as the container 10 and supported in a manner similar to the cup 13 shown in Figure 1. This cup 48 supports a paddle element 49 which is slidably mounted through the bottom of the cup 48, as shown, and the upper end thereof is provided with a transverse aperture 50 through which is extended a bendable or flexible strip 51 normally lying flat upon the bottom of the cup 48, as shown in Figure 12. The ends of the strip 51 may be bent upwardly to the position shown in dotted lines in Figure 12 to provide a finger grip to facilitate the drawing of the paddle element 49 upwardly through the aperture 52 formed in the bottom of the cup 48, which action will scrape the faces of the paddle 49 and cause the paddle to be kept clean when it is drawn above the cup 48.

In Figure 15 there is shown a still further modified form of the invention along the line of that shown in Figures 12 to 14, embodying a cup 48a supporting a paddle element 49a extending through a centrally located aperture formed in the cup 48a, the upper end of the paddle 49a normally lying below the upper edge of the cup 48a. A pair of flat strips 53 normally lie flat upon the bottom of the cup 48a and are provided with upstanding ends 54 which are riveted or otherwise anchored to opposite sides of the upper end of the paddle 49a. These strips 53 may be swung upwardly to the position shown in dotted lines to provide finger-gripping means, for drawing the paddle 49a upwardly through the cup 48a.

In Figures 16 and 17 there is shown another form of the invention wherein is illustrated a cup 55 through the center of which is extended a paddle 56 having an overhanging head 57 which overhangs the aperture through which the paddle extends. A transverse sealing strip 58 preferably of paper or other fragile material is extended through the paddle 56 directly below the cup 55 to provide an efficient seal. When it is desired to break the seal and use the paddle to adjust its position within the cup 55, this may be done by gripping the head 57 by the fingers and pulling upwardly, thereby breaking the fragile strip 58.

In Figure 18 a further modified type of structure is shown embodying a cup 59 carrying a paddle 60 which extends centrally through the cup 59 upwardly and carries a hood 61 at its upper end which is adapted to be cemented or in any other manner fixed to the upper face of the cup 59. When it is desired to use the paddle 59, the hood 61 may be gripped by the fingers and pulled upwardly breaking the connection between the hood and the cup and allowing the paddle to be adjusted such as is shown in dotted lines in Figure 18.

In Figures 19 and 20, there is shown a still further modified form of the invention somewhat similar to that shown in Figures 12 to 15. In this type shown in Figures 19 and 20 a threaded metallic cap 62 is illustrated which is adapted to thread over a conventional jar and this cap 62 is provided with an inset central portion 63 through which is slidably mounted a paddle element 64 having laterally extending finger grip strips 65 hingedly secured at the upper end of the paddle element 64 and normally lying within the inset portion 63 substantially flush with the upper face of the cap 62. This type is especially adapted for use in shallow receptacles where it is desired to pack a maximum amount of material within the receptacle. These strips 65 may be swung to the position shown in dotted lines in Figure 19 for facilitating the raising and lowering of the paddle element 64, and these strips 65 substantially conform to the shape of the inset portion 63, such as shown in Figure 20, a portion thereof being cut off to provide a flat edge 66 to facilitate the raising of the strips 65 from a position shown in full lines in Figure 19 to a position shown in dotted lines.

In Figure 21 there is shown yet a further modified form of the invention wherein a metallic threaded cap 67 is illustrated having an inset threaded neck 68 through which a dishing element 69 extends, the dishing element 69 having a threaded head 70 which is adapted to fit within the threaded neck 68 and normally lie flush with the outer face of the cap 67 when the element 69 and the head 70 are in a closed position. The element 69 may be raised by unthreading the head 70 from the inset threaded neck 68 as will be obvious by considering Figure 21.

In the form shown in Figure 1 wherein the cup 13 is in the nature of a cone, the cup 13 may be dropped into the open end of the container and because of the fact that the cup tapers toward its inner end, the cup will right itself to the proper position when placed in the neck of the container. Furthermore, the cup or associated elements may be made from any suitable material depending upon the chemical nature of the material placed within the container. I have provided a very sanitary covered seal for containers which will keep dirt and insects and germs from contaminating the contents of the container. It is not desired to limit the present invention to any particular type of serving element, cap or container, and certain detail changes may be made in the mechanical construction so long as these changes fall within the scope of the appended claims and constitute only a matter of design. The structure as defined in this application facilitates the packing and shipping of the containers in a minimum amount of space, thereby saving shipment charges as well as packing charges. The containers because of the cap and cup construction may be uniformly stacked in a comparatively small space on shelves and the like since the containers may be stacked one upon another, the cap and cup as well as the serving element providing a flush upper end for the cap.

It should be understood that the serving element in the nature of the paddle, spoon or other structure, should at all times extend tightly through the cup, the cup protecting the hands and preventing insects and the like from entering the container, as well as preventing the contents of the container from drying and hardening from evaporation. Should the cup and element be lifted from the container and held upside down, the drippings from the element will fall on the cup and prevent the substance upon the element from being wasted since the substance will drop on the cup and not upon other objects. When the cup is returned to the container, the substance will drop from the bottom back into the container.

Having described the invention what I claim as new is:

In combination with a container having an open outer end, said container having an inset flange providing a ledge portion at the open end thereof, the ledge portion having an upturned periphery, a cup having a lateral flange overhanging said ledge portion, a dishing element suspended from said cup, and a snap cover cap fitting over the open outer end of said container for sealing the same and clamping said lateral flange of said cup upon said inset flange of said container.

ROBERT W. BANKS.